United States Patent
Hong et al.

(10) Patent No.: US 6,954,332 B1
(45) Date of Patent: Oct. 11, 2005

(54) ULTRA-SHORT YOKE AND ULTRA-LOW STACK HEIGHT WRITER AND METHOD OF FABRICATION

(75) Inventors: Liubo Hong, San Jose, CA (US); Ronald A. Barr, Mountain View, CA (US); Dashun Steve Zhou, Sunnyvale, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 0 days.

(21) Appl. No.: 10/242,091

(22) Filed: Sep. 11, 2002

Related U.S. Application Data

(63) Continuation of application No. 09/268,088, filed on Mar. 12, 1999, now Pat. No. 6,765,756.

(51) Int. Cl.$^7$ .............................................. G11B 5/147
(52) U.S. Cl. ........................................................ 360/126
(58) Field of Search ................................ 360/126, 317, 360/123; 347/71

(56) References Cited

U.S. PATENT DOCUMENTS

| | | | |
|---|---|---|---|
| 4,386,383 A | 5/1983 | Desserre et al. |
| 4,652,954 A | 3/1987 | Church |
| 4,700,252 A | 10/1987 | Muraoka et al. |
| 4,713,710 A | 12/1987 | Soda et al. |
| 4,727,643 A | 3/1988 | Schewe et al. |
| 4,771,350 A | 9/1988 | Desserre |
| 4,907,113 A | 3/1990 | Mallary |
| 4,967,298 A | 10/1990 | Mowry |
| 5,142,426 A | 8/1992 | Re et al. |

(Continued)

OTHER PUBLICATIONS

Dubin, V.M. et al., "Electro–Chemical Deposition of Copper for VLSI Metallization," 1997 VMIC Conference, Jun. 10–12, 1997, Santa Clara, CA, pp. 69–74.

U.S. Appl. No. 09/268,088, filed Mar. 12, 1999, Hong, Ultra–Short Yoke and Ultra–Low Stack Height Writer and Method of Fabrication.

*Primary Examiner*—Tianjie Chen
(74) *Attorney, Agent, or Firm*—Joshua C. Harrison; Carr & Ferrell LLP

(57) ABSTRACT

The present invention provides an improved thin film write head and method of fabrication capable of providing an ultra-short yoke and/or an ultra-low conductor winding stack. The present invention reduces yoke length and stack height by forming the conductor winding in a trench etched from an insulation layer, preferably formed of an inorganic insulation material. A thin resist mask is used to define the width of the trench while the etch process defines the depth. Preferably, the insulation layer is formed on a different inorganic insulation material to control the etch process, thus, the conductor winding may be formed on the underlying layer. The conductor winding preferably is formed by depositing conductor material so that it fills the trench and then planarizing, such as by chemical mechanical polish, to remove conductor material deposited outside the trench. An organic insulation layer, such as cured photoresist, may be deposited on the planarized surface of the conductor winding to insulate it from an overlying yoke. This overlying organic insulation layer may also define the apex angle of the head. The present invention may have multiple layers of conductor winding. The subsequent layers of conductor may be formed similar to the first layer, or may be formed with conventional photoresist processes and structures. The present invention may utilize any known pole structure or material.

25 Claims, 6 Drawing Sheets

U.S. PATENT DOCUMENTS

| | | | |
|---|---|---|---|
| 5,168,409 A | 12/1992 | Koyama et al. | |
| 5,264,980 A | 11/1993 | Mowry et al. | |
| 5,270,895 A | 12/1993 | Ruigrok et al. | |
| 5,331,493 A | 7/1994 | Schwarz | |
| 5,438,747 A | 8/1995 | Krounbi et al. | |
| 5,452,164 A | 9/1995 | Cole et al. | |
| 5,476,804 A | 12/1995 | Lazzari | |
| 5,493,464 A | 2/1996 | Koshikawa | |
| 5,566,442 A | 10/1996 | Gaud et al. | |
| 5,576,098 A | 11/1996 | Arimoto et al. | |
| 5,576,914 A | 11/1996 | Rottmayer et al. | |
| 5,597,496 A | 1/1997 | Masaichi et al. | |
| 5,621,593 A | 4/1997 | Kitajima | |
| 5,621,596 A | 4/1997 | Santini | |
| 5,640,753 A | 6/1997 | Schultz et al. | |
| 5,649,351 A | 7/1997 | Cole et al. | |
| 5,668,689 A | 9/1997 | Schultz et al. | |
| 5,691,867 A | 11/1997 | Onuma et al. | |
| 5,700,380 A | 12/1997 | Krounbi et al. | |
| 5,702,756 A | 12/1997 | McKean et al. | |
| 5,703,740 A | 12/1997 | Cohen et al. | |
| 5,734,531 A | 3/1998 | Nix et al. | |
| 5,793,578 A | 8/1998 | Heim et al. | |
| 5,822,161 A * | 10/1998 | Yagyu | 360/126 |
| 5,828,533 A | 10/1998 | Ohashi et al. | |
| 6,024,886 A | 2/2000 | Han et al. | |
| 6,034,847 A | 3/2000 | Komuro et al. | |
| 6,034,848 A | 3/2000 | Garfunkel et al. | |
| 6,063,512 A | 5/2000 | Osaka et al. | |
| 6,130,809 A * | 10/2000 | Santini | 360/317 |
| 6,154,347 A * | 11/2000 | Sasaki | 360/317 |
| 6,178,070 B1 * | 1/2001 | Hong et al. | 360/126 |
| 6,226,149 B1 * | 5/2001 | Dill et al. | 360/126 |
| 6,317,288 B1 * | 11/2001 | Sasaki | 360/126 |
| 6,338,551 B1 * | 1/2002 | Sugiura et al. | 347/71 |
| 6,466,401 B1 * | 10/2002 | Hong et al. | 360/123 |

* cited by examiner

ULTRA-SHORT YOKE AND ULTRA-LOW STACK HEIGHT WRITER AND METHOD OF FABRICATION

This application is a continuation of U.S. application Ser. No. 09/268,088 filed on Mar. 12, 1999, now U.S. Pat. No. 6,765,756; and claims priority therefrom pursuant to 35 U.S.C. § 120.

BACKGROUND OF THE INVENTION

1. Technical Field

The present invention relates to the field of thin film write heads.

2. Background Art

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is determined by the amount of data stored on an area of magnetic media and depends on how much area must be allocated to each bit. Data on magnetic media is often stored in a line or track. Magnetic media often have multiple tracks. In the case of the disk, the tracks are nested annular rings. More bits per ring and more rings per disk increases data density. Data density, therefore, is determined not only by the bit length, but also by the width of the bit which determines the track width. To decrease bit size, head size is decreased by fabricating thin film read and write heads with smaller track widths. Thin film heads commonly employ separate write and read heads.

Typically write heads do not contact the magnetic media but instead are separated from the magnetic media by a layer of air or air bearing. Magnetic flux generated between poles of the write head acts across the air bearing to change the magnetic moment of an area on the magnetic media.

Thin film write heads are typically formed by depositing and etching layers of magnetic, non-magnetic, dielectric, and electrically conductive materials to form the structures of the head, such as a core, a conductor winding, and upper and lower pole structures.

The rate or frequency that data is stored to the media is an important measure of the operational performance of the write head. One way to improve the operating frequency of the write head is to reduce the length of the pole structures, such as the yoke, to decrease the head inductance and the magnetic flux rise time. The operating frequency is determined, in part, by the structure of the write head and the materials used. The efficiency of the write head is also increased by reducing the yoke length.

Typical conductor windings of write heads are formed by first depositing a seed layer on a cured photoresist layer. To form the conductor winding, a photoresist pattern is formed on the seed layer by depositing photoresist on the seed layer, exposing to light through a photo mask, and removing a portion to form a trench extending to the seed layer. The trench define the placement and dimensions of the conductor that forms the winding. The conductor winding typically is deposited by electroplating with copper to form the conductor winding within the trench on the exposed seed layer.

After forming the conductor winding, the photoresist pattern is stripped, and a wet chemistry etch is used to remove the remaining copper seed layer. As the seed layer typically is removed by wet chemistry etch, part of the winding conductor material is also etched away. The winding is surrounded with photoresist, which is cured to form an organic dielectric insulation.

Additional conductor windings typically are formed over the above described winding in a similar fashion, and electrically connected to it to form a multi-layered conductor winding.

One problem with the above process is that it limits the minimum dimension of the winding. The distance between corresponding edges of successive conductor turns, referred to as the pitch, and the height of the conductor is limited by photolithographic techniques. As such the height to width ratio or aspect ratio of the conductor is usually less than about 1.5. In addition, the minimum width of the photoresist defining the trench typically is greater than about 0.4 microns.

Another drawback of the above process and structure is that it produces a coil structure with a high overall stack height. Because the pitch is limited and the total length of the coil winding is relatively long, the conductors are often formed having greater height to provide sufficient cross sectional area in order to achieve sufficiently low coil resistance. In addition, a second or even a third winding layer often is formed to increase the number of coil turns without drastically increasing the yoke length to improve the operation of the winding. Also, because cured photoresist is difficult to form in extremely thin layers, the cured photoresist insulation typically formed under the conductor winding significantly increases the overall stack height.

High stack height makes it difficult to control the width of the upper or P2 pole tip in certain write head designs, thus leading to increased track width sigma. The increased stack height can cause problems with focusing and scattering during the exposure process, as well as problems of shadowing during pole trim process.

In addition, high stack height can cause reliability problems, such as cracking of the magnetic yoke material at the apex, or on the sloped surface between the top of the stack and the pole tip. Also, the steep slope associated with the high stack height causes the magnetic properties of the yoke material to degrade.

Furthermore, thermal stability is a problem with the structure described above. There is a large thermal expansion mismatch between the metal and the surrounding cured photoresist. The coefficient of expansion of the cured photoresist $\alpha_{resist}$ is greater than or equal to about 10 times the coefficient of expansion of the conductor $\alpha_{metal}$. This can cause separation of yoke from the underlying insulation when the head is heated to higher temperature during manufacture, or operatation.

BRIEF SUMMARY OF THE INVENTION

The present invention provides an improved thin film write head and method of fabrication. The structure and method of the fabrication allow for an ultra-short yoke and/or an ultra-low stack height.

The present invention reduces yoke length and stack height by forming the conductor winding in trench etched from an insulation layer. With the preferred embodiment, the insulation layer is formed of an inorganic material which is etched using a resist mask to define the width of the trench. Preferably, the insulation layer is formed on planarize layer formed of a different inorganic insulation material. The inorganic materials should be selected so that the etching process may be stopped, or slowed, at the underlying planarized layer.

In the preferred embodiment, the conductor winding is formed on the underlying planarized layer by depositing conductor material so that it fills the trench. Conductor material deposited outside the trench is removed by planarization, such as by chemical mechanical polish, to form the conductor winding. An insulation layer, either organic such as cured photoresist, or inorganic such as $Al_2O_3$ or $SiO_2$, may be deposited on the planarized surface of the conductor winding to insulate it from an overlying yoke. The overlying insulation layer may also define the apex angle of the head.

The present invention may have multiple layers of conductor winding. The subsequent layers of conductor may be formed similar to the first layer, or may be formed with conventional photoresist processes and structures.

The present invention is capable of being formed with any known pole structure. For example, embodiments of the present invention may employ pedestal pole tips that are integrally formed, or separately, formed from the yoke, or pole structures. Furthermore, the conductor winding may be formed on a middle coat, a write gap layer, a sub-write gap layer, or other suitable layer.

The present invention allows coil pitch to be reduced. The aspect ratio of the trench and of the insulation between the turns is not limited as in the conventional photolithographic process. With the present invention, the photoresist mask is used to define the width of the trench and distance between the turns of the trench, while the etch process defines the depth of the trench. As such, the turns of the conductor winding may be formed closer together and with higher aspect ratio.

For example, the preferred embodiment and method of fabrication allows a coil pitch $\leq 2$ microns, and even as small as 0.4 microns. In addition, the conductor width may be as small as 0.18 microns, and turn spacing as small as about 0.1 microns. Furthermore, coil height/width ratio may be as high as 8:1.

The improved aspect ratio allows more turns in a single layer of winding. As such, in some applications a second layer of conductor winding may be unnecessary, thus reducing the stack height. Reducing the stack height also reduces the length of the yoke and thus reduces the flux path length through the yoke.

Also, the present invention allows the coil pitch to be reduced by reducing the spacing between winding turns, or by producing a higher aspect ratio conductor. Thus, the yoke length from the air bearing surface may be reduced.

With the preferred embodiment, stack height may also be reduced by eliminating the organic insulation layer typically found below the conductor winding. In addition, as inorganic insulation layers may be deposited thinner than organic insulation, the preferred embodiment and method of fabrication allows for reduced stack height.

Yet another advantage of the structure and method of the present invention, is that it allows for a reduced number of curing cycles. Typically, multiple resist layers are cured to form organic insulation. With the preferred embodiment, only one curing bake is used to effect insulation of the conductor winding. Limited exposure to curing heat improves yields and reliability.

A further advantage of the structure of the preferred embodiment is that the conductor winding is formed adjacent to inorganic material. The inorganic material provides improved heat dissipation over organic insulation so limits temperatures, thus improving the reliability of the head.

DESCRIPTION OF THE INVENTION

The Preferred Embodiments of the Present Invention

FIGS. 1–3 & 16

Figure 1:
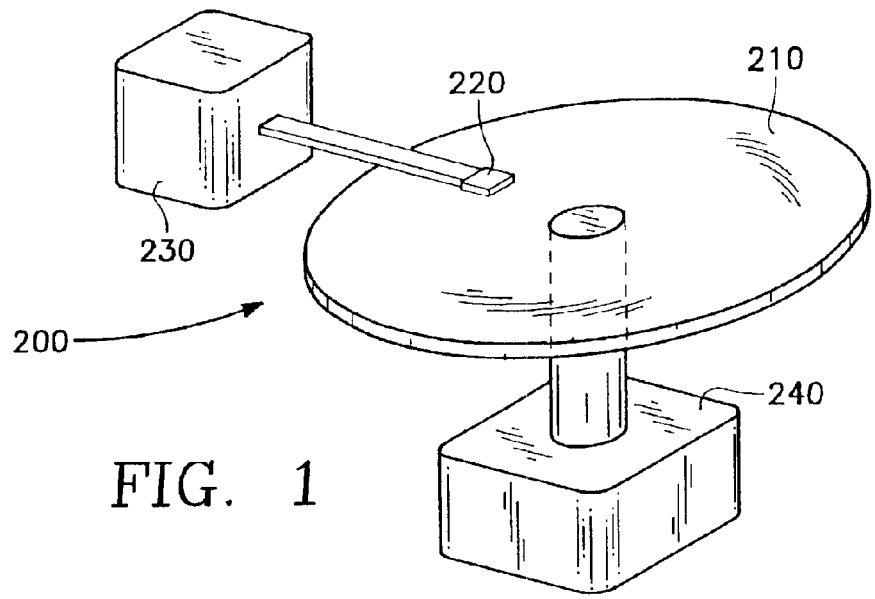
FIG. 1 illustrates a data storage and retrieval apparatus employing the write head of the present invention.

FIG. 1 shows the thin film write head of the present invention embodied in a disk type magnetic data storage and retrieval apparatus 200. The write head of the present invention is located within a merged head assembly 220 which rides above a magnetic storage media 210, depicted in FIG. 1 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Figure 2:
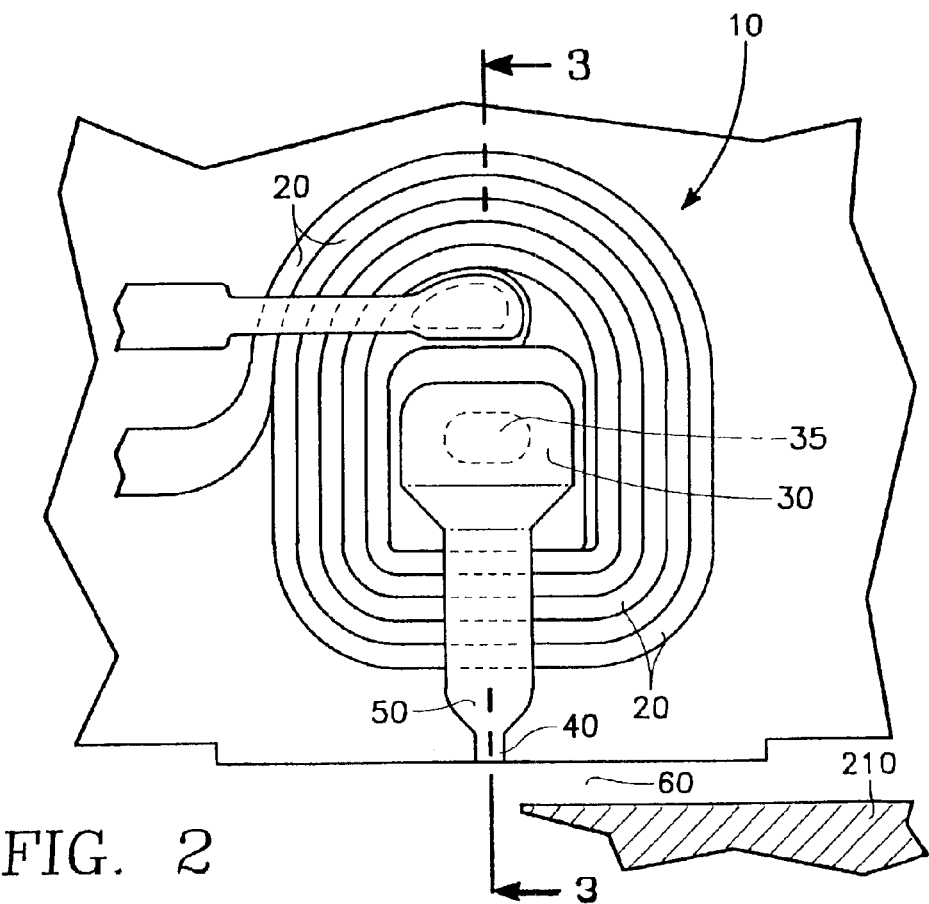
FIG. 2 shows a cross sectional cut away of a possible embodiment of the write head of the present invention.

FIG. 2 depicts a partial cut away top view of an embodiment of the thin film write head 10 of the present invention. Conductors 20 encircle a core 30 to produce magnetic flux in the core 30. The flux generated in the core 30 is coupled to an upper pole tip 40 via a yoke 50 and returns through a lower pedestal pole tip 85 and a lower pole layer 80, shown in FIG. 3, which is coupled to the yoke 50 through a backgap 35. The flux generated across a write gap 70, shown in FIG. 3, between the upper pedestal pole tip 45 and the lower pedestal pole tip 85 writes across an air bearing 60 to a magnetic media which is moved with respect to the write head 10.

Figure 3:
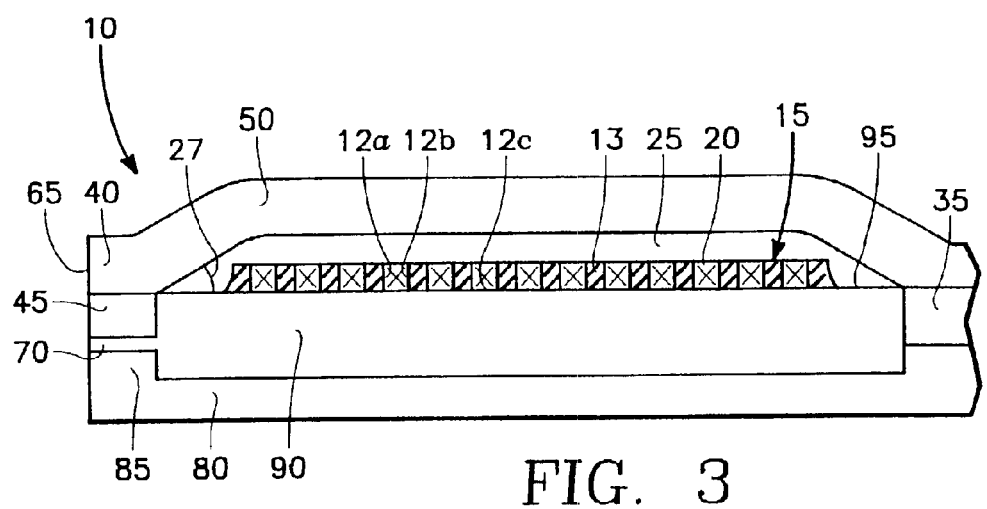
FIG. 3 is a cross sectional side view of a preferred embodiment of the thin film write head of the present invention along 3—3 of FIG. 2.

FIG. 3 illustrates a cut-away side view of a preferred embodiment of the thin film write head 10 of the present invention. In the embodiment of FIG. 3, the conductor winding 20 is embedded in an insulation layer 15. The conductor winding 20 is deposited in a trench 12 (defined by walls 12a–c) formed in the insulation layer 15. The insulation layer 15 is formed of an insulator material other than cured photoresist. This allows a trench 12 to be formed by etching techniques rather than exposure and removal of photoresist. As discussed further below, a photoresist mask, formed on the insulation layer 15, defines the trench width during the etch process.

Forming the trench by etching insulation layer 15 rather than by exposing and removing photoresist allows the aspect ratio of the trench to be increased. It also allows the distance between the individual turns of the trench to be reduced. That is to say, the turns of the conductor are closer together. Reducing both the pitch and width of the conductor winding allows a shorter yoke length.

In the preferred embodiment, insulation layer 15 is formed of an inorganic material, such as $SiN_x$, $SiO_2$, $Al_2O_3$, or the like. A material having a lower coefficient of expansion, or having a coefficient of expansion similar to the yoke 50 or other structures, may be selected to improve the thermal stability and reliability of the write head 10.

The insulation layer 15 is formed on a middle coat or filler layer 90. The middle coat 90 is formed of an insulative material. As discussed further below, it is preferable to form the middle coat 90 of a different inorganic insulator from that of insulation layer 15 to facilitate etch process control.

As such, in the preferred embodiment of FIG. 3, the conductor winding is formed directly on an underlying inorganic layer, such as middle coat layer 90. This allows stack height to be reduced by eliminating the organic insulation layer typically found below the conductor winding. In addition, as inorganic insulation may be deposited thinner than an organic insulation, the height of the insulation layer 15 may be reduced as compared to a cured photoresist insulation layer.

A further advantage of the structure of the preferred embodiment is that the conductor winding is formed adjacent to inorganic material. The inorganic material having high thermal conductivity provides improved heat dissipation over organic insulation so improves the reliability of the head.

In the embodiment of FIG. 3, a lower pedestal pole tip extends from a lower pole layer 80 and opposes an upper pedestal pole tip 45 across a write gap layer 70. The write gap layer 70 is formed of an insulator such as $Al_2O_3$, and may be formed of the same material as the middle coat 90.

Although the upper and lower pole tip 45 & 85 are depicted as pedestal pole tips, the upper and lower pole tips may be formed having any known structure such as disclosed in: U.S. Pat. No. 5,452,164, by Cole, et al., entitled THIN FILM MAGNETIC WRITE HEAD, issued on Sep. 19, 1995; U.S. Pat. No. 5,621,593, by Kitajima, et al., entitled MAGNETORESISTIVE HEAD AND METHOD OF FABRICATING THE SAME, issued on Apr. 15, 1997; or U.S. Pat. No. 5,438,747, by Kronubi, et al., entitled METHOD OF MAKING A THIN FILM MERGED HEAD WITH ALIGNED POLE TIPS, issued on Aug. 8, 1995, all herein incorporated by reference in their entireties. The present invention is intended to be utilized to improve write heads with all known head pole and yoke structures. For example, embodiments of the present invention may employ pedestal or non-pedestal type pole tips, which may be integrally formed, or separately formed from the yoke or the pole structure. The yoke and pole may be sputtered, or plated, to form the structures. Furthermore, the conductor winding may be formed on a middle coat, a write gap layer, a sub-write gap layer, or other suitable layer.

An insulation layer 25 is formed on the top surface of the conductor winding 20 and may serve to insulate it from the yoke 50. The insulation layer 25 may be formed of cured photoresist and also may be used, in write heads with non-stitched upper poles, to define the zero throat level.

An advantage of the preferred embodiment and method of fabrication of the present invention is that because it has a low stack height it allows for a low apex angle 27 for insulation layer 25 without detrimentally affecting yoke length. This allows high moment materials, which do not perform well when deposited over steep slopes, to be used to from the yoke 50. The lower stack height and corresponding lower apex angle 27, therefore, increases the materials available for use when forming the upper pole tip 40 and yoke 50. High moment materials with low impedance to magnetic flux improve the operating frequency of the head 10, and allow structures to carry greater magnetic flux without saturating. As a result, the head can write with both higher data density and higher data rate.

Figure 16:
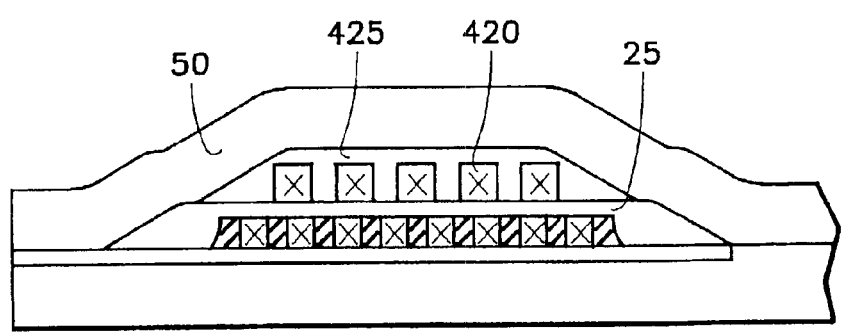
FIG. 16 is an alternate embodiment of the write head of FIG. 2 along the 3—3.

The conductor winding 20 of the write head 10 may have a second or upper layer of conductor winding 420 as shown in FIG. 16. The second layer of conductor winding 420 may be formed on insulation layer 25. A conventional photoresist process may be used to form the second layer of conductor winding 420. The yoke may be formed on the organic insulation layer 425.

It is also possible to form the second layer 420 using the same method used to form the first or lower layer of the conductor winding, as discussed above. As such, an inorganic insulation layer may be formed over, or directly on, the lower conductors to provide insulation between the conductor layers, to provide etch control, and to reduce overall stack height. In such an embodiment, the apex angle may be formed as discussed above, after the second layer 420 has been formed.

Method for Fabricating the Preferred Embodiment

FIGS. 4–15

Figure 4:
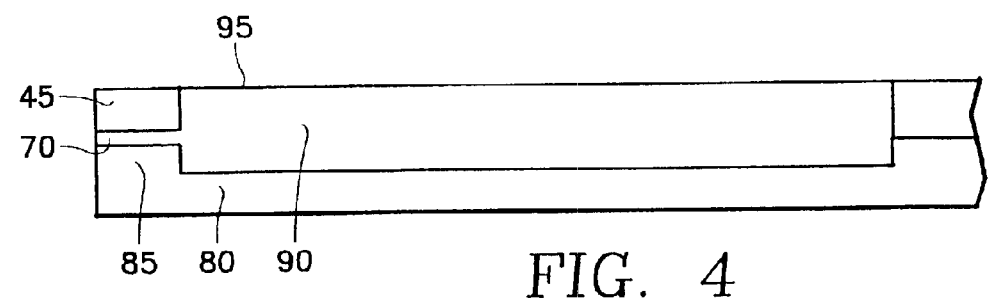
FIG. 4 is a cross sectional side view showing partial fabrication of the write head of FIG. 3.

Turning to FIG. 4, in the preferred embodiment of the present invention, the conductor winding 20 (not shown in FIG. 4) may be fabricated on a planarized surface 95. The planarized surface 95 of the middle coat 90 is formed after the lower pole layer 80 and the lower pedestal pole tip 85. In the embodiment of FIG. 4, the write gap 70 and upper pedestal pole tip 45 are also formed prior to forming the planarized surface 95. In the embodiment of FIG. 4, the middle coat 90 may be formed of $SiO_2$, $SiN_x$, $Al_2O_3$, or the like. The middle coat 90 may be formed of the same material as the write gap layer 70 and may be built-up in several steps.

It is possible, among the several alternative methods for forming the planarized surface 95, to form the conductors on a write gap layer which extends past the pedestal pole tips

45 & 85. Such a write gap layer could be planarized, or be deposited over a planarized underlayer in preparation for forming the conductor winding.

Figure 5:
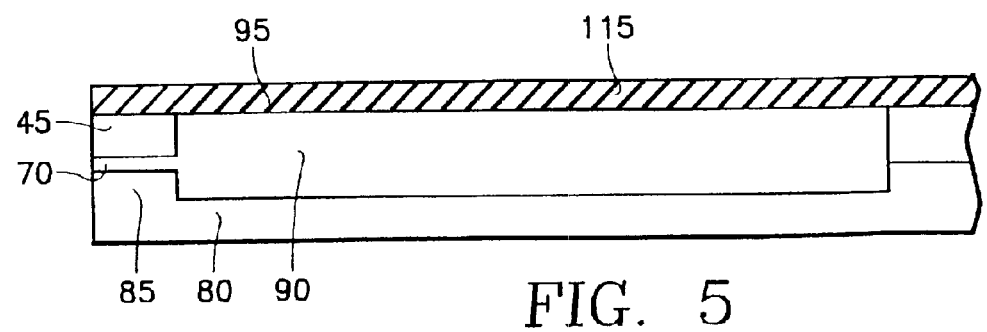
FIG. 5 is a cross sectional side view showing partial fabrication of the write head of FIG. 3.

Turning to FIG. 5, the insulation layer 115 is formed on the planarized surface 95. The insulation layer 115 may be formed of any etchable dielectric, such as $SiO_2$, $SiN_x$, $Al_2O_3$, or the like. The insulation layer 115 may be formed by CVD or chemical vapor deposition, by PVD or physical vapor depostion, or by any technique known in the art.

It is preferred to select a material for insulation layer 115 that is different from that selected for the middle coat 90 to provide etch control. For example, if $Al_2O_3$ is selected for the middle coat 90, $SiO_2$, or $SiN_x$, may be selected for insulation layer 115.

Figure 6:
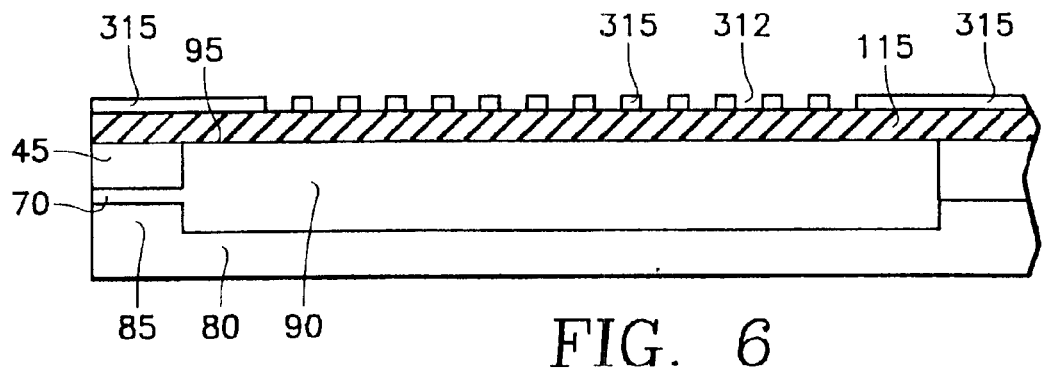
FIG. 6 is a cross sectional side view showing partial fabrication of the write head of FIG. 3.

Turning to FIG. 6, a resist layer 315 is deposited on the insulation layer 115. It is exposed and a portion is removed so as to define a trench 312 in the resist layer 315. Because the resist layer 315 only defines the width of the trench and not the depth, it may be deposited in a very thin layer. This allows the width of the trench 312 and the width of the resist portions separating the trench turns to be reduced. Conventional photoresist techniques may be used to form the thin layer photoresist and the trench pattern.

Figure 7:
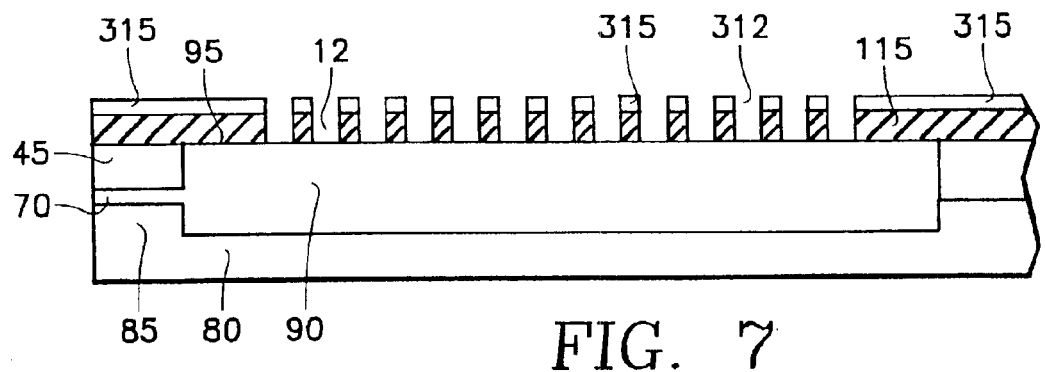
FIG. 7 is a cross sectional side view showing partial fabrication of the write head of FIG. 3.

Turning to FIG. 7, the insulation layer 115 is etched using the resist layer 315 as a mask to form a trench 12 in the insulation layer 115. RIE or reactive ion etch may be used to etch the insulation layer 115. It is preferred to select the etch chemistry so that the etch process will etch essentially only the insulation layer 115 and will slow, or stop, at the underlying middle coat layer 90. For example, if $SiN_x$, $SiO_2$, or the like, are selected for the insulation layer 115 and $Al_2O_3$, or the like is selected for middle coat layer 90, fluorine etch chemistry may be used to form the trench 12 in the insulation layer 115. As such, in the preferred embodiment, the thickness of the insulation layer 115 essentially will be the height of the conductor material after the conductor winding is formed. Thus, the bottom wall of the trench 12 is a portion of the middle coat 90.

Figure 8:
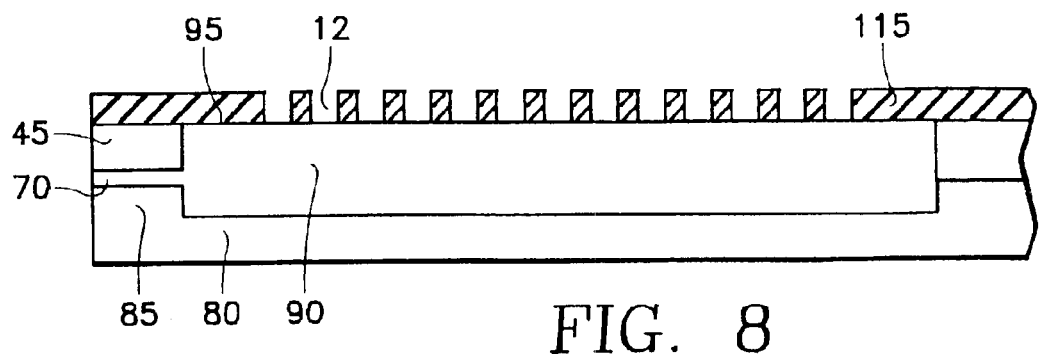
FIG. 8 is a cross sectional side view showing partial fabrication of the write head of FIG. 3.
Figure 9:
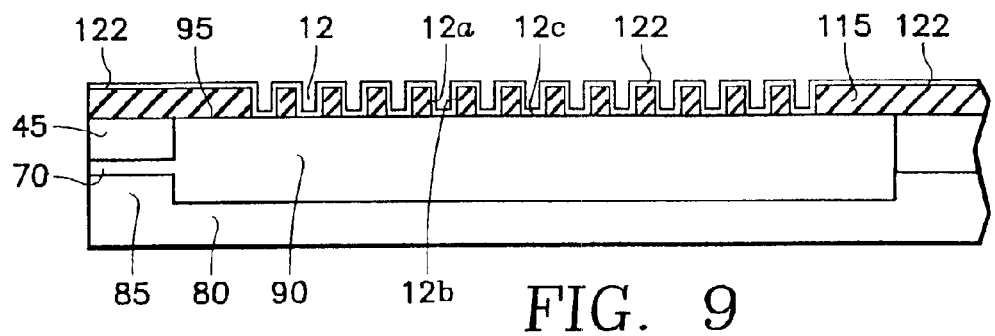
FIG. 9 is a cross sectional side view showing partial fabrication of the write head of FIG. 3.

Turning to FIGS. 8 & 9, after the insulation layer 115 is etched, the resist layer is removed and a seed layer 122 is deposited on the etched insulation layer 115 so that the seed material forms on the sidewalls 12a & 12b and the bottom wall 12c of the trench 12. Any seed layer 122 that also forms outside the trench 12, later may be removed by planarization as discussed below. The seed layer may be deposited by sputtering, or by CVD or chemical vapor deposition, and may be formed of copper, aluminum, gold, tungsten, or other conductive material. Typically, the seed layer 122 is formed several hundred to 1500 Å thick.

Figure 10:
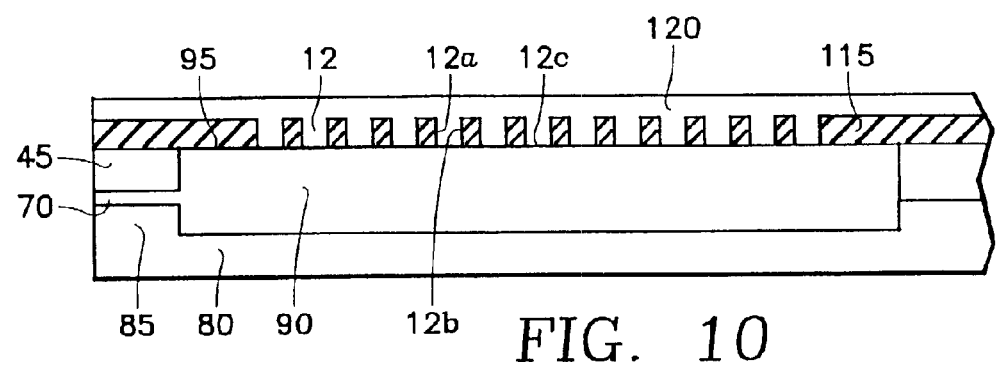
FIG. 10 is a cross sectional side view showing partial fabrication of the write head of FIG. 3.

Turning to FIG. 10, a conductor layer 120, such as copper, aluminum, gold, tungsten, or other conductive material is deposited on the seed layer 122. The conductive layer 120 is deposited so that it fills the trench 12. The conductive material may be deposited by electroplating.

Figure 11:
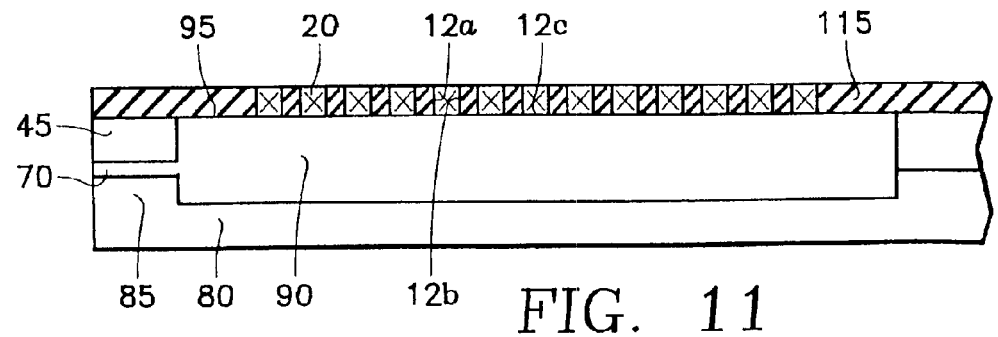
FIG. 11 is a cross sectional side view showing partial fabrication of the write head of FIG. 3.

Turning to FIG. 11, the conductive material not in the trench 12 is removed to form the conductor winding 20. A CMP or chemical mechanical polish may be used to remove the portion of the conductor layer 120 not in the trench 12 and to remove the portion of the seed layer 122 not in the trench 12. Preferably, the chemical mechanical polish should remove all conductive material not in the trench 12 and stop at the insulation layer 115.

Figure 12:
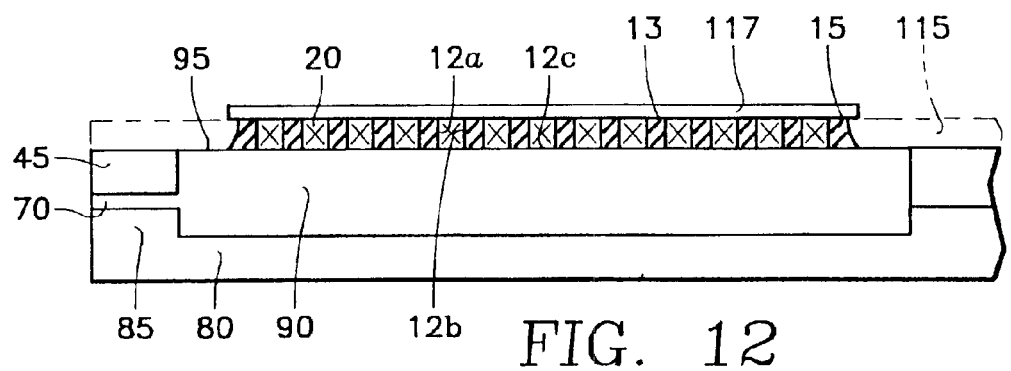
FIG. 12 is a cross sectional side view showing partial fabrication of the write head of FIG. 3.
Figure 13:
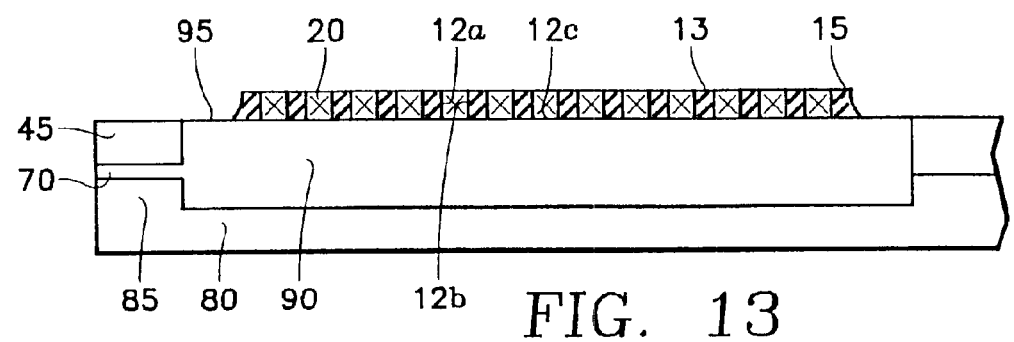
FIG. 13 is a cross sectional side view showing partial fabrication of the write head of FIG. 3.

Turning to FIGS. 12 & 13, a resist mask 117 is formed over the conductor winding 20 and a portion of the insulation layer 115. The remaining portion of the insulation layer 115 that is not under the resist mask 117 is removed to form the insulation layer 15. In the embodiment of FIG. 12, the conductor winding 20 and the insulation layer 15 are recessed from pedestal pole tip. The insulation layer 115 may be etched by isotropic, or by anisotropic wet etch or dry etch, to form insulation layer 15. The resist mask 117 may be striped away as shown in FIG. 13.

Figure 14:
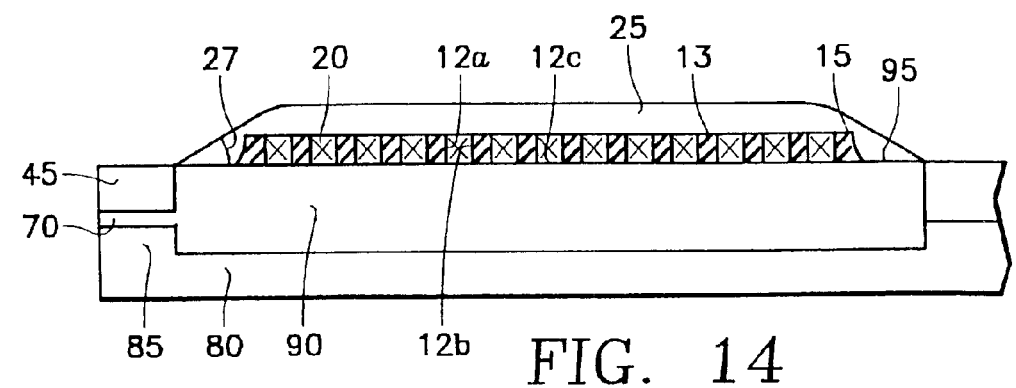
FIG. 14 is a cross sectional side view showing partial fabrication of the write head of FIG. 3.

An insulation layer 25 is formed on the top surface of the conductor winding 20 as shown in FIG. 14. The insulation layer 25 insulates the top surface of the conductor winding 20 and may be formed so that it also defines the zero throat level in writers with non-stitched upper poles. The insulation layer 25 may be an organic insulation, such as cured photoresist.

An advantage of using an organic insulation layer, such as photoresist, is that it is easily deposited and cured to form a low apex angle 27 and also may be used to define the zero throat in writers with non-stitched upper poles (shown in FIG. 16). It also is possible in some embodiments, to remove a portion of the insulation layer 25 over the conductor winding 20 and insulation layer 15, such as by selectively exposing and removing the portion, while leaving the remaining portion of the insulation layer 25 on the middle coat or other underlying layer 90 to define the apex angle. An inorganic insulation may be deposited over the exposed conductor winding 20 prior to formation of the yoke, or of a second layer of conductor winding.

Figure 15:
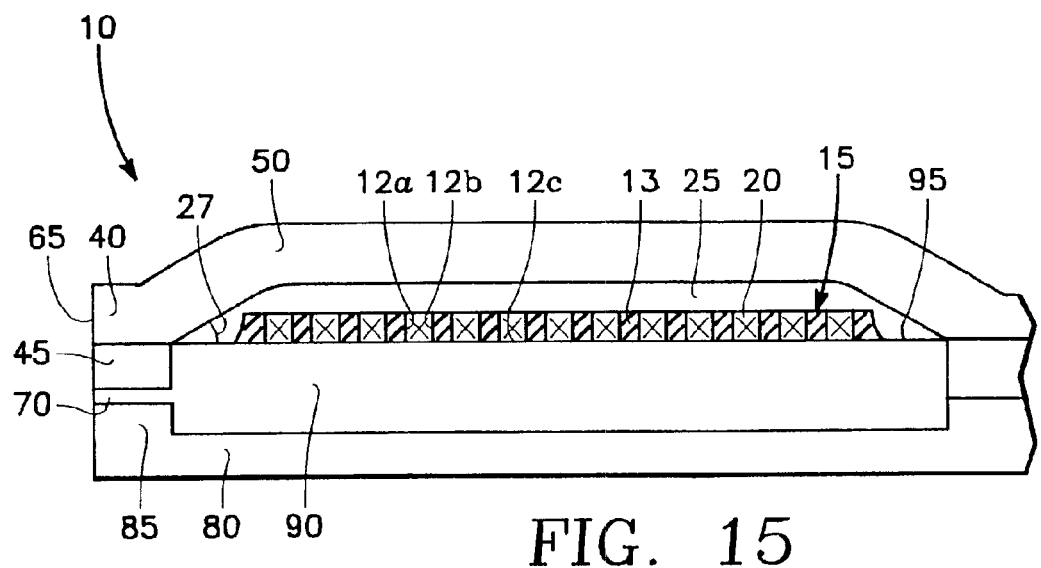
FIG. 15 is a cross sectional side view of the write head of FIG. 2 along the 3—3.

The yoke 50, shown in FIG. 15, may be formed over the insulation layer 25 over the single layer conductor winding shown in FIG. 14 or it is possible to form the yoke 50 over a second layer of conductor turns 420 as shown in FIG. 16. The second layer of conductor turns may be formed using the same method discussed above.

If the second layer is formed using the above method, it is possible to remove the excess inorganic insulation material lateral to the first layer of winding after the subsequent turn layers have been formed. Furthermore, removing the excess inorganic material lateral to the conductor winding, and defining the apex angle, may be performed after the multiple layers of conductor winding have been formed.

With the multiple layer conductor winding, any suitable inorganic insulation layer may be formed between the conductor winding turn layers to provide insulation between the conductor layers and to provide etch control as discussed above. The yoke may be formed on an organic insulation layer 425 formed over the multilayer conductor winding. It is also possible to form any additional conductor layer, and the insulation covering that layer, using conventional photoresist processes if desired.

The preferred embodiment and method of fabrication allows coil pitch to be reduced. The aspect ratio of the trench and of the insulation between the turns is not limited as in the conventional photolithographic process. The photoresist mask 315 is used to define the width of the trench 12 and distance between the turns of the trench 12, while the etch process defines the depth of the trench. As such, the turns of the winding may be formed closer together and with improved aspect ratio.

For example, the preferred embodiment and method of fabrication allows a coil pitch $\leq 2$ microns, and even as small as 0.4 microns. In addition, the conductor width may be as small as 0.18 microns, and turn spacing as small as about 0.1 microns. Furthermore, coil height/width ratio may be as high as 8:1.

The reduced coil pitch and improved aspect ratio allow more turns in a single layer of winding. As such, in some applications a second layer of conductor winding may be unnecessary, thus reducing the stack height. Besides improving reliability and helping control of write track width, reducing the stack height also reduces the length of the yoke and thus improves operating frequency by reducing the flux path length through the yoke.

Also, the present invention allows the coil pitch to be reduced, by reducing the spacing between winding turns, or by producing a higher aspect conductor. Thus, the yoke length may be reduced.

With the preferred embodiment, stack height may also be reduced by eliminating the organic insulation layer typically found below the conductor winding. In addition, as inorganic insulation layers may be deposited thinner than organic insulation, the preferred embodiment and method of fabrication allows for reduced stack height.

Yet another advantage of the structure and method of the present invention, is that it allows for a reduced number of curing cycles. Typically, multiple resist layers are cured to form organic insulation. With the embodiment of FIG. 3, only one curing bake is required to form the organic insulation 25 surrounding the conductor winding 20. Limited exposure to curing heat improves yields and reliability.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film write head comprising:
   a write gap layer;
   upper and lower poles opposing each other across the write gap layer;
   a planarized inorganic conductor insulation layer disposed over the write gap layer and including a spiral trench;
   an organic insulation layer disposed over the conductor insulation layer, the organic insulation layer defining an apex angle of the upper pole; and
   a conductor winding having at least a portion disposed in the trench.

2. The thin film write head of claim 1 further including a middle coat layer disposed between the lower pole and the conductor insulation layer.

3. The thin film write head of claim 2 wherein the lower pole includes a lower pole pedestal and a back gap pedestal.

4. The thin film write head of claim 3 wherein the middle coat layer is further disposed between the lower pole pedestal and the back gap pedestal.

5. The thin film write head of claim 2 further comprising a back gap connecting the upper and lower poles and wherein the upper pole includes an upper pole pedestal.

6. The thin film write head of claim 5 wherein the middle coat layer is further disposed between the upper pole pedestal and the back gap.

7. The thin film write head of claim 6 wherein the upper pole pedestal, middle coat layer, and back gap have coplanar top surfaces.

8. The thin film write head of claim 2 wherein the conductor insulation layer is formed of a different inorganic insulator than the middle coat layer.

9. The thin film write head of claim 2 wherein the middle coat layer and the write gap layer are formed of the same material.

10. The thin film write head of claim 1 wherein the conductor insulation layer is formed of a material selected from the group consisting of $SiN_x$, $SiO_2$, and $Al_2O_3$.

11. The thin film write head of claim 1 wherein the conductor insulation layer has a coefficient of thermal expansion similar to a coefficient of thermal expansion of the upper pole.

12. The thin film write head of claim 1 wherein the conductor insulation layer has a coefficient of thermal expansion less than a coefficient of thermal expansion of the upper pole.

13. The thin film write head of claim 1 wherein the write gap layer is formed of an insulator.

14. The thin film write head of claim 1 wherein the write gap layer is formed of $Al_2O_3$.

15. The thin film write head of claim 1 wherein the organic insulation layer is formed of cured photoresist.

16. The thin film write head of claim 1 wherein a coil pitch of the conductor winding is in the range of about 0.4 to 2 microns.

17. The thin film write head of claim 1 wherein a width of the conductor winding is in the range of about 0.18 to 2 microns.

18. The thin film write head of claim 1 wherein a turn spacing between adjacent turns of the conductor winding is in the range of about 0.1 to 2 microns.

19. The thin film write head of claim 1 wherein a ratio of a height of the conductor winding to a width of a turn of the conductor winding is in the range of about 1 to 8.

20. The thin film write head of claim 1 wherein the conductor winding includes a first layer of turns disposed at least partially in the trench and a second layer of turns disposed over the first layer of turns.

21. The thin film write head of claim 20 wherein the second layer of turns is embedded in cured photoresist.

22. The thin film write head of claim 20 wherein the second layer of turns is embedded in a second inorganic conductor insulation layer.

23. A thin film write head comprising:
   a write gap layer;
   upper and lower poles opposing each other across the write gap layer and joined together at a back gap;
   a planarized inorganic conductor insulation layer disposed over the write gap layer and including a trench;
   an organic insulation layer disposed over the conductor insulation layer, the organic insulation layer defining an apex angle of the upper pole; and
   a conductor winding having at least a portion disposed in the trench and wound around the back gap.

24. A thin film write head comprising:
   a lower pole including a lower pole pedestal and a back gap pedestal;
   an upper pole including an upper pole pedestal opposing the lower pole pedestal across a write gap, the upper pole pedestal being joined to the upper pole at a first interface defining a first plane;
   a write gap layer disposed within the write gap;
   a back gap joining the upper pole at a second surface defining a second plane that is coplanar with the first plane, the back gap joining the back gap pedestal to the upper pole;
   a middle coat layer disposed between the lower pole pedestal and the back gap pedestal;
   a conductor insulation layer including a trench and disposed over the middle coat layer;
   an organic insulation layer disposed over the conductor insulation layer, the organic insulation layer defining an apex angle of the upper pole; and
   a conductor winding having at least a portion disposed in the trench.

25. The thin film write head of claim 24 wherein the middle coat layer includes a top surface defining a third plane that is coplanar with the first plane.

* * * * *